(12) United States Patent
Inagaki

(10) Patent No.: US 8,643,744 B2
(45) Date of Patent: Feb. 4, 2014

(54) IMAGE PROCESSING APPARATUS AND IMAGE FILE MANAGEMENT METHOD

(75) Inventor: Kensuke Inagaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 17 days.

(21) Appl. No.: 13/174,821

(22) Filed: Jul. 1, 2011

(65) Prior Publication Data

US 2012/0002077 A1 Jan. 5, 2012

(30) Foreign Application Priority Data

Jul. 5, 2010 (JP) ................................ 2010-152850

(51) Int. Cl.
*H04N 5/76* (2006.01)
*H04N 5/225* (2006.01)

(52) U.S. Cl.
USPC ..................................... 348/231.2; 348/220.1

(58) Field of Classification Search
USPC ........ 348/231.2, 231.3, 231.9, 231.1, 231.99, 348/333.11, 220.1, 231.7, 231.8
See application file for complete search history.

(56) References Cited

U.S. PATENT DOCUMENTS

| | | | |
|---|---|---|---|
| 8,264,564 B2 * | 9/2012 | Kita | 348/222.1 |
| 8,400,528 B2 * | 3/2013 | Ochi et al. | 348/231.99 |
| 8,531,541 B2 * | 9/2013 | Terashima | 348/222.1 |
| 2003/0095195 A1 * | 5/2003 | Iwauchi | 348/231.99 |
| 2003/0112357 A1 * | 6/2003 | Anderson | 348/333.05 |
| 2009/0207279 A1 * | 8/2009 | Ochi et al. | 348/231.99 |
| 2010/0134644 A1 * | 6/2010 | Kita | 348/222.1 |
| 2010/0194963 A1 * | 8/2010 | Terashima | 348/333.11 |

FOREIGN PATENT DOCUMENTS

| | | |
|---|---|---|
| JP | 11-341421 A | 12/1999 |
| JP | 2003-158645 A | 5/2003 |
| JP | 2005-143020 A | 6/2005 |

* cited by examiner

*Primary Examiner* — James Hannett
*Assistant Examiner* — Ahmed A Berhan
(74) *Attorney, Agent, or Firm* — Rossi, Kimms & McDowell LLP

(57) ABSTRACT

An image processing apparatus capable of storing as many number of image files as possible, while adding file names conforming to a file storage standard, and capable of making it easy for a user to browse the desired image file among a vast number of continuously photographed image files. When one or plural representative images are selected from among continuously photographed images, a control unit of a digital camera as the image processing apparatus stores the one or more selected representative images into a memory card after a file name conforming to the file storage standard is added to each representative image, and stores continuously photographed images other than the one or more representative images into the memory card after file names not conforming to the file storage standard are added to these images.

5 Claims, 7 Drawing Sheets

US 8,643,744 B2

IMAGE PROCESSING APPARATUS AND IMAGE FILE MANAGEMENT METHOD

BACKGROUND OF THE INVENTION

1. Field of the Invention

The present invention relates to an image processing apparatus such as a digital camera having a continuous photographing function and relates to a method for management of image files created at continuous photographing.

2. Description of the Related Art

There have been known digital cameras having a continuous photographing mode for continuously photographing an object. In recent years, with speed-up of image sensors and with speed-up of image processing processors, it becomes possible to record a large number of files at one continuous photographing shot. With increase of recording medium capacity, it also becomes possible to record an enormous number of image files into one recording medium.

A DCF (Design Rule for Camera File System) standard, which is one of standards of image storage methods for digital cameras, stipulates that a file number should be added to each image file and a folder number (directory number) should be added to each folder (directory) into which image files are stored.

As techniques to manage a large number of image files according to the DCF standard, there have been proposed a method for creating a new folder each time continuous photographing is performed and for storing image files into the created folder (see, Japanese Laid-open Patent Publication No. 11-341421), a method for recording files while adding continuous-photographing IDs to header parts of these files (see, Japanese Laid-open Patent Publication No. 2005-143020), and a method for renaming folders with folder names not conforming to the DCF standard when an upper limit of the number of folders or of files stipulated in the DCF standard is reached (see, Japanese Laid-open Patent Publication No. 2003-158645).

With a digital camera having a continuous photographing function, an enormous number of image files are created each time continuous photographing is performed. On the other hand, the DCF standard has upper limits of the number of folders and of files up to which folder and files can be created in one recording medium. In other words, the techniques disclosed in Japanese Laid-open Patent Publications Nos. 11-341421 and 2005-143020 pose a problem that it becomes impossible to further store image files, if the number of created folders or of created files exceeds the upper limit of the number of folders or of files stipulated in the DCF standard.

The DCF standard stipulates that a folder number should be added to each folder name and a file number should be added to each file name. The folder number and the file number are generally increased in the order in which files are stored. With the techniques disclosed in Japanese Laid-open Patent Publications Nos. 11-341421, 2005-143020, and 2003-158645, when continuously photographed images are browsed by using a PC (personal computer) or the like, a problem is posed that many very similar images are continuously reproduced since the continuously photographed images have similar names.

SUMMARY OF THE INVENTION

The present invention provides an image processing apparatus and an image file storage method, which are capable of storing as many number of image files as possible, while adding thereto file names conforming to a file storage standard, and capable of making it easy for a user to browse the desired image file among a vast number of continuously photographed image files.

According to one aspect of this invention, there is provided an image processing apparatus comprising an image pickup unit configured to pickup an image, a storage unit configured to store, as a file, the image obtained by the image pickup unit, a representative image selection unit configured to select at least one representative image from among images photographed by continuous photographing in a case where the continuous photographing is performed by the image pickup unit, and a control unit configured to store into the storage unit the representative image selected by the representative image selection unit and added with a filename conforming to a file storage standard and to store, into the storage unit, images which are other than the representative image and which are respectively added with file names not conforming to the file storage standard.

With this invention, it is possible to store as many number of image files as possible, while adding thereto file names conforming to a file storage standard, and to make it easy for a user to browse the desired file name among a vast number of continuous photographed image files.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
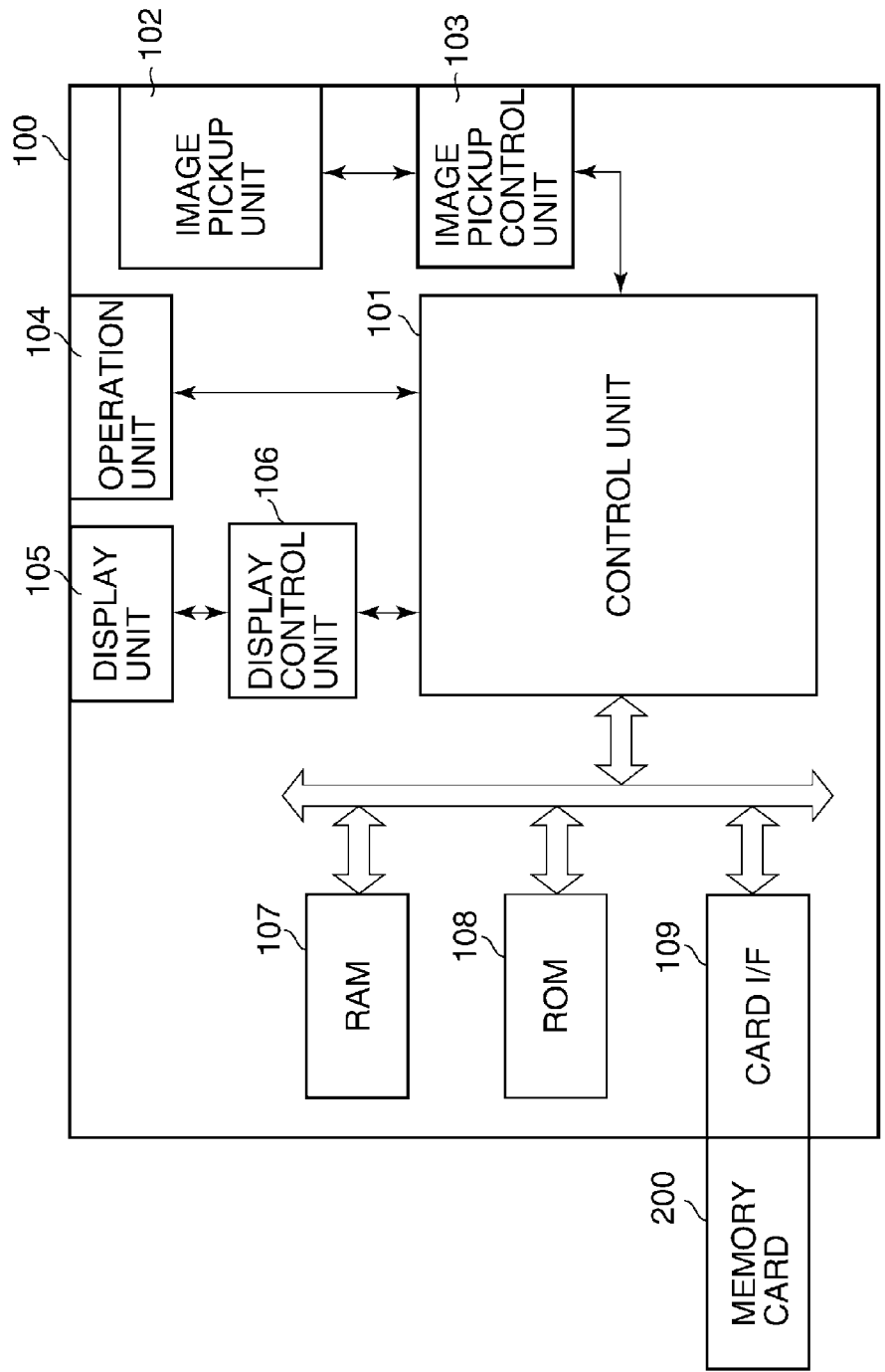
FIG. 1 is a block diagram schematically showing the construction of a digital camera, which is an example of an image processing apparatus according to one embodiment of this invention.

FIG. 1 schematically shows in block diagram the construction of a digital camera, which is an image processing apparatus according to one embodiment of this invention. The overall control of the digital camera 100 (i.e., control of operations of respective parts of the digital camera 100 and signal processing) is performed by a control unit 101 having a CPU not shown. An image pickup unit 102 includes various lenses such as a taking lens and a zoom lens, and includes an image pickup device such as a CCD for converting, into an electrical signal, an optical image taken into the image pickup device through the lenses. An image pickup control unit 103 controls the zoom lens and the image pickup device of the image pickup unit 102.

An operation unit 104 is provided with a power button, a mode dial, a shutter button, etc., and accepts a user's operation. An image obtained by the image pickup unit 102, a GUI (Graphical User Interface) created by the control unit 101, etc. are displayed by a display unit 105 that includes, e.g., a LCD display panel and is controlled by a display control unit 106.

A RAM 107 stores temporary data used by the control unit 101 for its operation and stores a program which is in execution. A ROM 108 stores various control programs to be executed by the control unit 101, data of various setting conditions of the digital camera 100, setting values set by the user, and the like. In this embodiment, the ROM 108 is implemented by an EPROM into which data can be erasably written. A memory card 200 can be connected to the digital camera 100 through a card I/F 109. The memory card 200 is a recording medium for storing image files photographed by the digital camera 100 and any data files.

Figure 2:
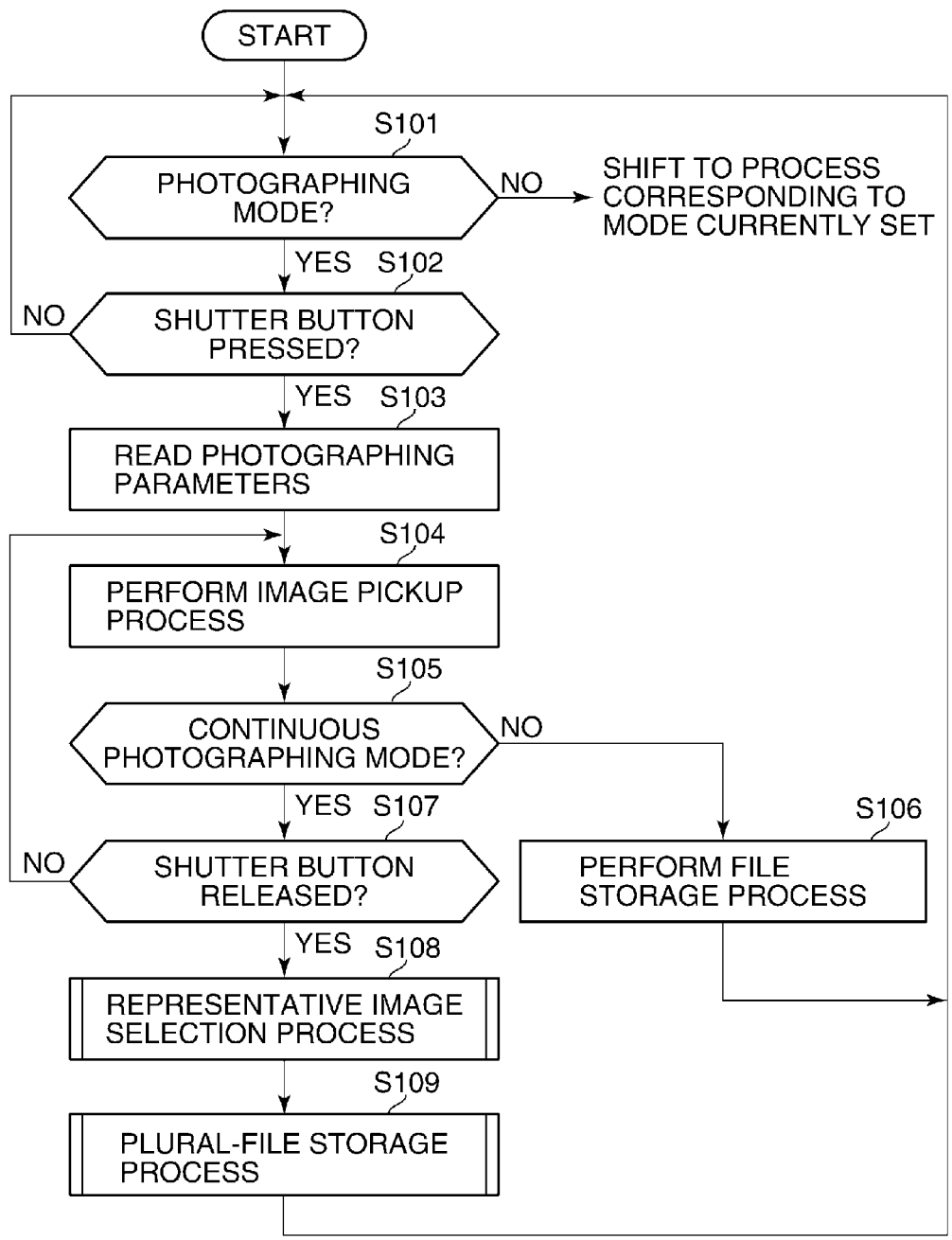
FIG. 2 is a flowchart showing a photographing process performed by the digital camera.

FIG. 2 shows in flowchart a photographing process performed by the digital camera 100. The photographing process is performed by the control unit 101 by reading the required program and required data from the RAM 107 and the ROM 108 and by controlling respective parts of the digital camera 100.

When the user operates the operation unit 104 to turn on the power of the digital camera 100, the control unit 101 determines whether or not a photographing mode is set by the mode dial of the operation unit 104 (step S101). If the photographing mode is not set (i.e., if NO to S101), the present process is shifted to a process corresponding to a mode currently set. If the photographing mode is set (if YES to S101), the control unit 101 determines whether the shutter button is pressed (step S102).

If the shutter button is not pressed (If NO to S102), the process returns to step S101. If the shutter button is pressed (if YES to S102), photographing parameters set by the user are read from the ROM 108 (step S103). The photographing parameters refer to setting values of shutter speed, sensor sensitivity, diaphragm value, white balance setting, etc. After the photographing parameters are read, an image pickup process is performed (step S104). The image pickup process refers to a process for storing into the RAM 107 optical image data obtained by the image pickup device of the image pickup unit 102 by converting an optical image into an electrical signal.

Next, whether or not a continuous photographing mode is set is determined (step S105). If the continuous photographing mode is not set (i.e., if NO to S105), a file storage process is performed (step S106), and then the process returns to step S101. The file storage process refers to a process for converting the optical image data, which has been stored into the RAM 107 in the photographing process in step S104, into an image format such as JPEG and for recording the resultant data into the memory card 200. On the other hand, if the continuous photographing mode is set (i.e., if YES to S105), whether the shutter button is released is determined (step S107).

If the shutter button is not released (i.e., if NO to S107), the process returns to step S104. If the shutter button is released (i.e., if YES to S107), a representative image selection process and a plural-file storage process are performed (steps S108 and S109). Then, the process returns to step S101.

Figure 3:
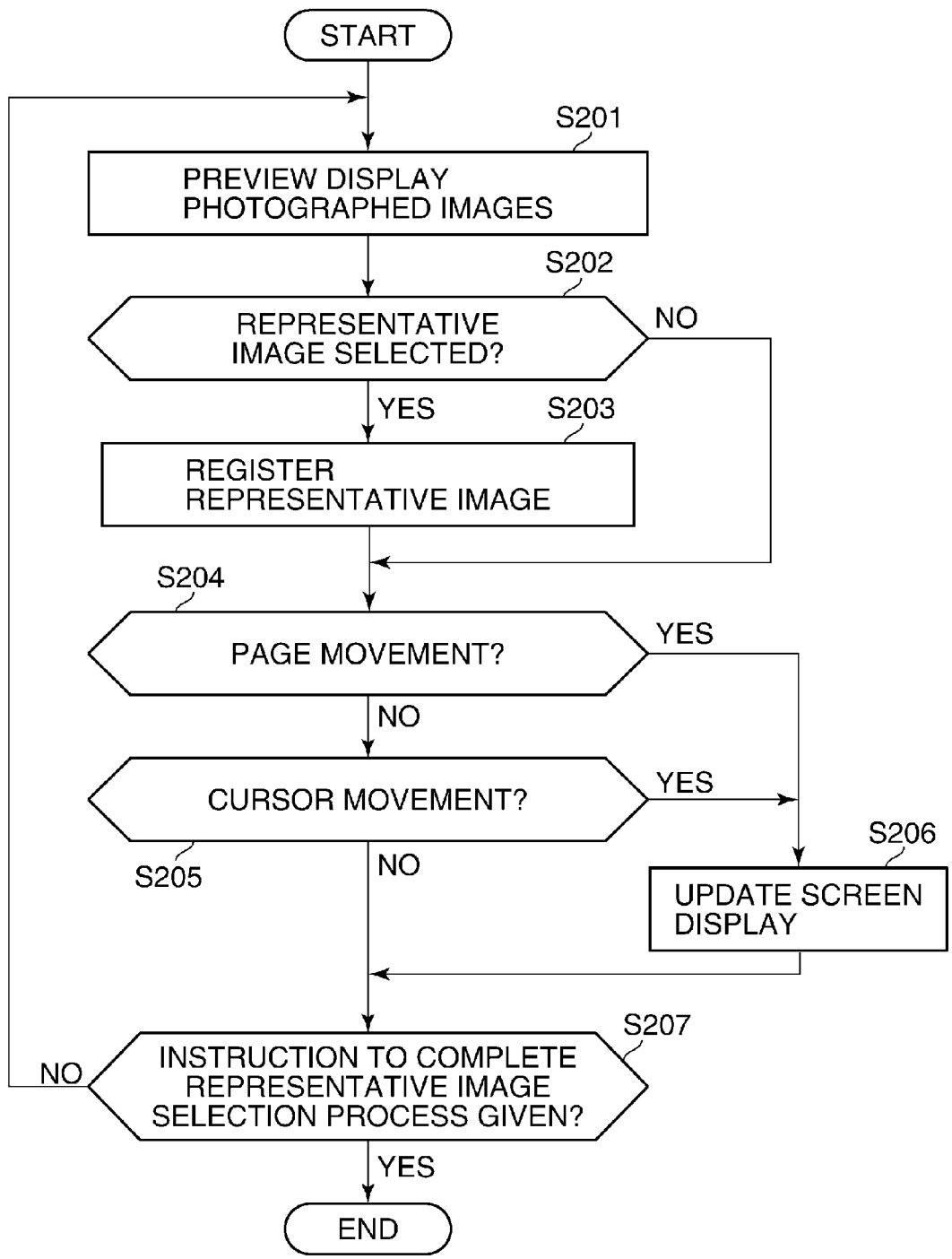
FIG. 3 is a flowchart showing the details of a representative image selection process performed in step S108 of the photographing process shown in FIG. 2.

FIG. 3 shows in flowchart the details of the representative image selection process performed in step S108 in FIG. 2. In the representative image selection process, a plurality of images photographed in the continuous photographing mode are preview displayed on a preview screen (step S201).

Figure 4:
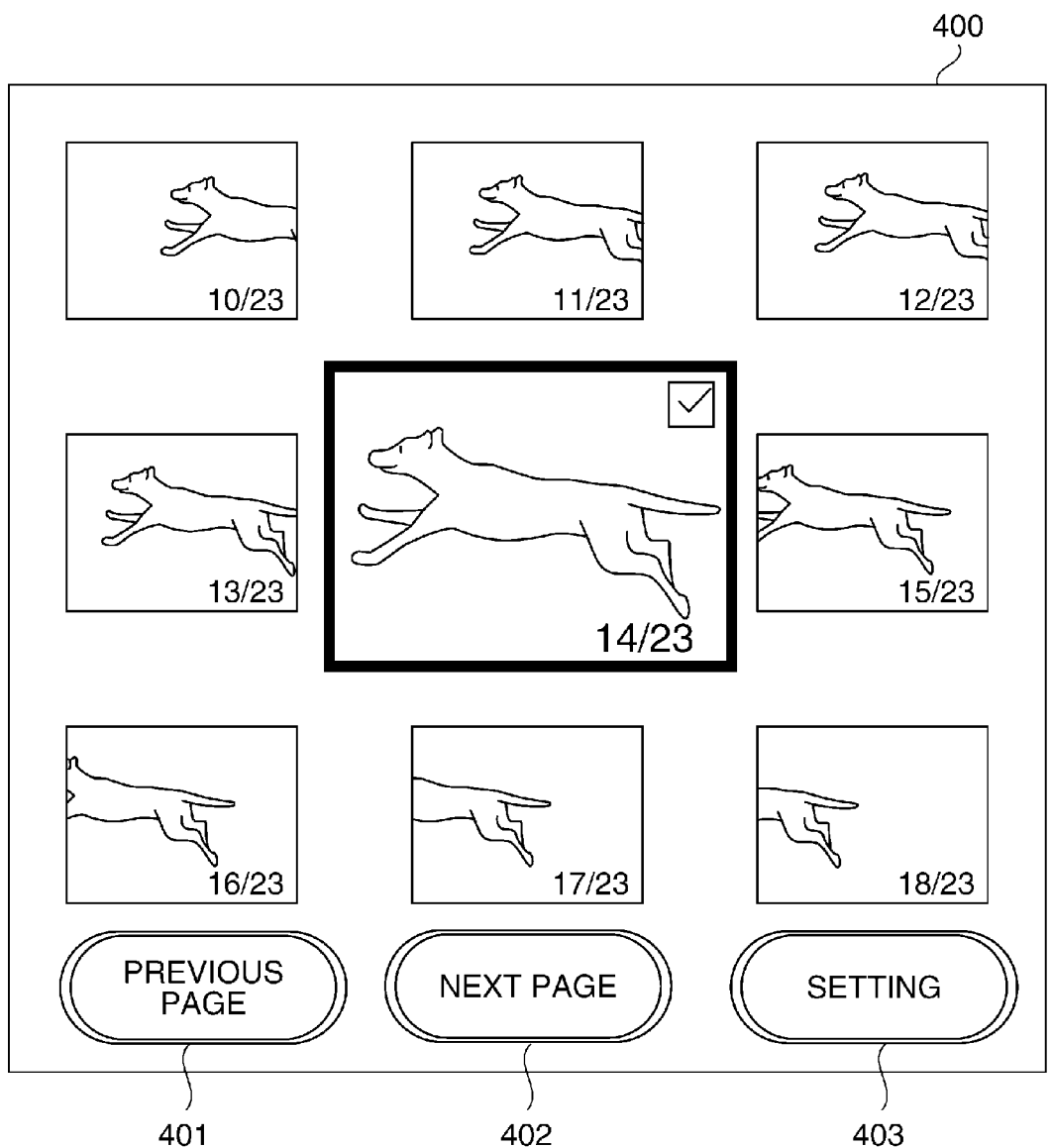
FIG. 4 is a view showing an example of a preview screen displayed in step S201 of the representative image selection process shown in FIG. 3.

FIG. 4 shows an example of the preview screen. On the preview screen 400, continuously photographed images are displayed in a list as thumb nail images. In FIG. 4, a selection cursor is placed on one image displayed centrally of the preview screen 400. The centrally displayed image is highlighted, thereby making it easy for the user to recognize the currently selected image.

Next, whether or not the image currently selected on the preview screen is selected as a representative image by the user is determined (step S202). For example, the user selects as a representative image the currently selected image by putting a check mark on the image, as shown in FIG. 4. In FIG. 4, there is shown a state where a check mark is put on the highlighted image. The check mark is switched ON when a setting button 403 is pressed once, and is switched OFF (disappears) when the setting button 403 is pressed again. It should be noted that check marks can be put on plural images so that they are selected as representative images.

If a representative image is selected, the control unit 101 registers the representative image into the RAM 107 (step S203). Next, whether or not a page movement is performed is determined (step S204). The page movement is performed when a previous page button 401 or a next page button 402 shown in FIG. 4 is operated or pressed.

If the page movement is performed (i.e., if YES to S204), the control unit 101 updates thumbnail images displayed on the preview screen 400 (step S206). If no page movement is performed (i.e., if NO to S204), the control unit 101 determines whether a cursor movement (or alteration of the selected image) is performed (step S205). If a cursor movement is performed (i.e., if YES to S205), the image to be highlighted on the preview screen 400 is changed, so that the screen display is updated (step S206).

Next, whether or not a user's instruction to complete the representative image selection process is given is determined (step S207). If the instruction to complete the selection process is given (i.e., if YES to S207), the control unit 101 completes the representative image selection process. If the instruction to complete the selection process is not given (i.e., if NO to S207), the process returns to step S201.

Figure 5:
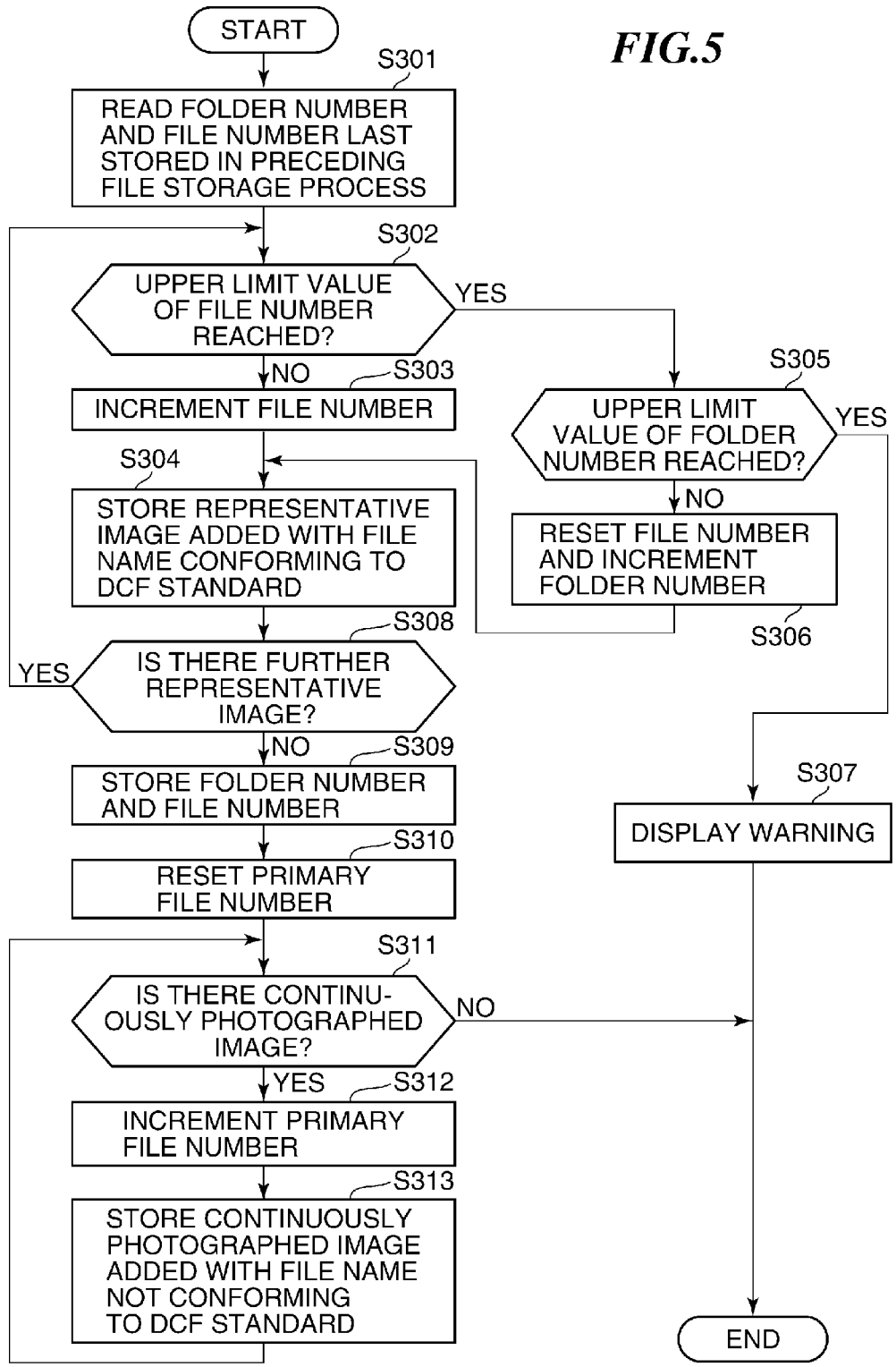
FIG. 5 is a flowchart showing the details of a plural-file storage process performed in step S109 of the photographing process shown in FIG. 2.

FIG. 5 shows in flowchart the details of the plural-file storage process performed in step S109 in FIG. 2. In the plural-file storage process, the control unit 101 reads from the ROM 108 a folder number and a file number last stored into the ROM 108 in the preceding file storage process (step S301). According to the DCF standard which is a file storage standard, a folder number is added to each folder name and a file number is added to each file name. In order to uniquely represent respective image files by using folder names and file names, it is necessary to update the file numbers (or the folder numbers and the file numbers) each time a new file is stored into the memory card 200.

After the folder number and the file number last stored in the preceding file storage process are read in step S301, whether or not the file number reaches an upper limit value thereof is determined (step S302). If the file number does not reach the upper limit value (i.e., if NO to S302), the file number is incremented (step S303), and the process proceeds to step S304. As the upper limit value of the file number, an upper limit value stipulated in the DCF standard or an upper limit value independently or uniquely defined can be used.

If the file number reaches the upper limit value (i.e., if YES to S302), whether or not the folder number reaches an upper limit value thereof is determined (step S305). As the upper limit value of the folder number, an upper limit value stipulated in the DCF standard or independently defined can be used, as with the upper limit value of the file number. If the folder number does not reach the upper limit value (i.e., if NO to S305), the file number is reset to a minimum value and the folder number is incremented (step S306). Then, the process proceeds to step S304. On the other hand, if the folder number reaches the upper limit value (i.e., if YES to S305), the control unit 101 causes the display unit 105 to display a warning that no further files can be stored (step S307), and completes the process.

In step S304, based on the file number decided in step S303 or S306, the control unit 101 adds a file name conforming to the DCF standard to the representative image selected in the representative image selection process in step S108, and stores the representative image into the memory card 200.

Next, whether or not there is a further representative image which has not been stored into the memory card 200 is determined (step S308). If there is a further representative image (i.e., if YES to S308), the process returns to step S302. If all of the one or more representative images have been stored and therefore there is no representative image to be stored (i.e., if NO to S308), the control unit 101 stores into the ROM 108 the last folder number and the last file number used for storage of the one or more representative images (step S309), and resets a primary file number, which will be described later (step S310).

Next, the control unit 101 determines whether there is a continuously photographed image (other than representative image) which has not been stored (step S311). If there is such a continuously photographed image (i.e., if YES to S311), the primary file number is incremented (step S312). Then, in step S313, the control unit 101 adds a file name not conforming to the DCF standard to the continuously photographed image by using the file number stored in step S309 and the primary file number incremented in step S312, and stores the continuously photographed image into the folder represented by the folder number stored in step S309, whereupon the process returns to step S311. The processing in steps S311 to S313 is repeated, if there is a continuously photographed image which has not been stored. The process is completed, if all the continuously photographed images have been stored (i.e., if NO to S311).

In the plural-file storage process described referring to FIG. 5, the at least one representative image is first stored, and then the other continuously photographed images are collectively stored. By storing the images according to such procedures, it is possible to avoid the representative image from being mixed with the continuously photographed images, e.g., when the files are sorted by a PC in a date and time order.

Figures 6A, 6B:
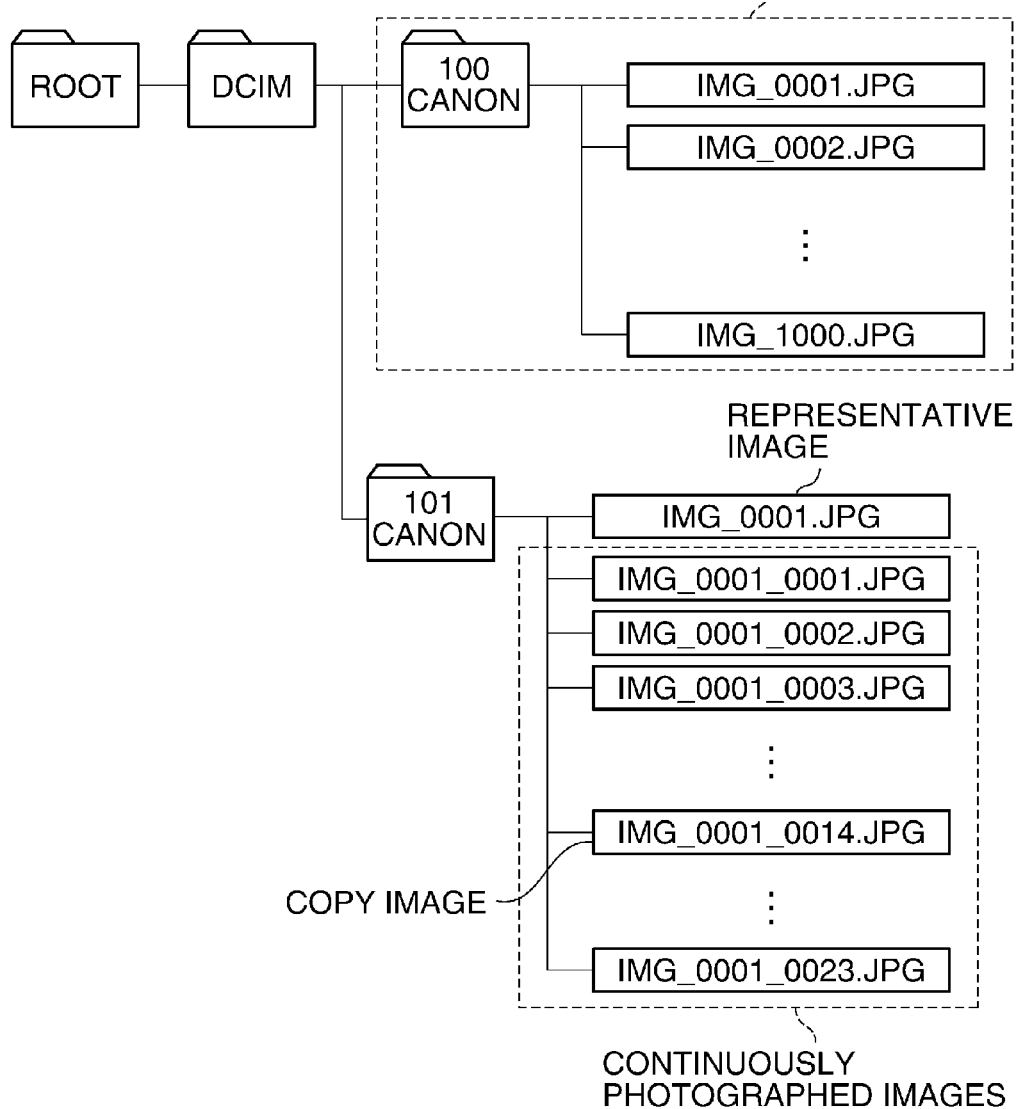
FIG. 6A is a view schematically showing an example of a folder structure including folders and files added with folder names and file names in the plural-file storage process shown in FIG. 5.
FIG. 6B is a view showing the file name of one of the files shown in FIG. 6A, especially, a primary file number in the file name.

The following is a description of how file names not conforming to the DCF standard are added to the continuously photographed images in step S313 of the plural-file storage process in FIG. 5. FIG. 6A schematically shows a folder structure (directory structure) including folders and files (images) added with folder names and file names in the plural-file storage process. The folder structure is stored in the memory card 200. FIG. 6B shows the file name of one of the files shown in FIG. 6A, especially, the primary file number in the file name.

In the folder structure shown in FIG. 6A, the folder named "100CANON" refers to a folder in which images photographed in the preceding photographing are stored, and the folder named "101CANON" refers to a folder newly created in the current plural-file storage process in step S109 in FIG. 2. It should be noted that for ease of explaining file names in the 101CANON folder in comparison with file names in the 100CANON folder, the files in the 100CANON folder are shown in the form where they are added with file names conforming to the DCF standard.

In the 101CANON folder, the file named "IMG_0001.JPG" whose name conforms to the DCF standard indicates the representative image (the fourteenth image among twenty-three continuously photographed images in FIG. 4), whereas the files named "IMG_0001_0001.JPG" to "IMG_0001_0023.JPG" indicate respective ones of the twenty-three continuously photographed images.

The file names "IMG_0001_0001.JPG" to "IMG_0001_0023.JPG" are comprised of the same character string "IMG_0001" as that included in the file name "IMG_0001.JPG" of the representative image, primary file numbers "0001" to "0023" which are added as sequential numbers to the character strings, and the same extension as the extension "JPG" included in the file name of the representative image. These file names do not conform to the DCF standard in that they include the primary file numbers.

By adding the above-described file names to the files belonging to the 101CANON folder in FIG. 6A, it becomes easy to determine that the representative image and the continuously photographed images other than the representative image were created by means of the same continuous photographing. Since the file names of the continuously photographed images include the primary file numbers which were added as sequential numbers in the order in which these images were photographed, it is easy to recognize the photographed order on the basis of the primary file numbers.

Since a copy image (whose file name is shown by "IMG_0001_0014.JPG" in FIG. 6A) of the representative image is stored in the 101CANON folder together with the continuously photographed images other than the representative image, it is possible to prevent the continuously photographed images from being reproduced with the representative image omitted when the continuously photographed images are continuously browsed by using, e.g., a personal computer (PC). However, it is not inevitably necessary to store the copy image of the representative image together with the continuously photographed images.

In the above-described embodiment, for the image file management in the digital camera 100, the representative image is associated with the continuously photographed images through the file names as shown in FIG. 6A. Alternatively, information that associates the representative image with the continuously photographed images can be stored into, e.g., a header part of each image file. More specifically, such associating information can be stored into an area for storing meta information defined by Exif (Exchangeable image File format) or the like.

Figure 7A:
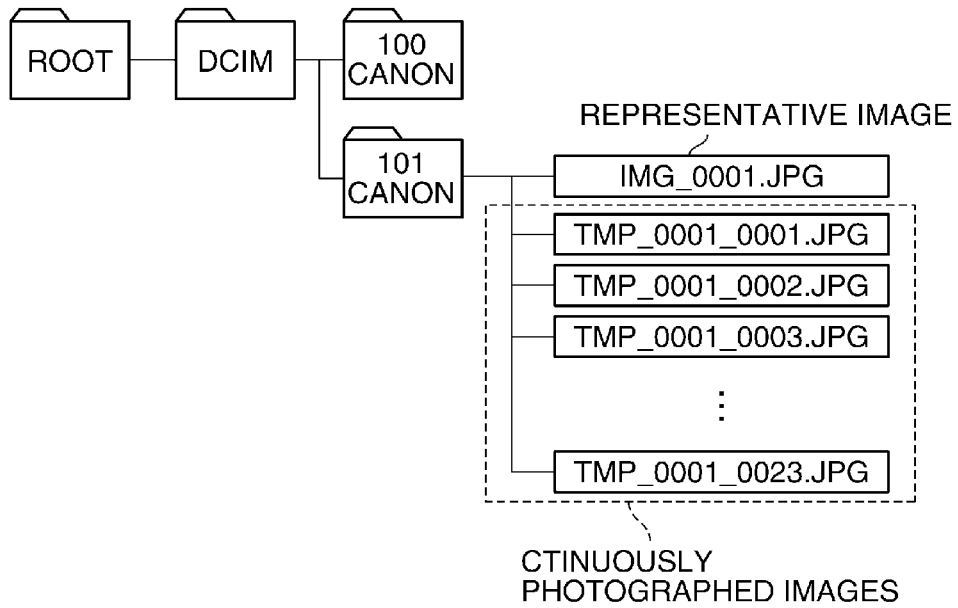
FIG. 7A is a view schematically showing another example of the way in which file names not conforming to the DCF standard are added to plural files in the plural-file storage process shown in FIG. 5.

FIG. 7A shows an example of way in which file names not conforming to the DCF standard are added to plural files in the plural-file storage process shown in FIG. 5 and which is different from the example of FIG. 6A. In the example shown in FIG. 6A, the file name "IMG_XXXX..." is added to each of the continuously photographed images according to the same naming rule as that for the representative image. On the other hand, in the example shown in FIG. 7A, a file name "TMP_XXXX . . . " with a file name part changed from "IMG" to "TMP" is added to each of continuously photographed images in accordance with a naming rule different from that in the example of FIG. 6A, to make it easy for the continuously photographed images to be subsequently distinguished from the representative image.

Figure 7B:
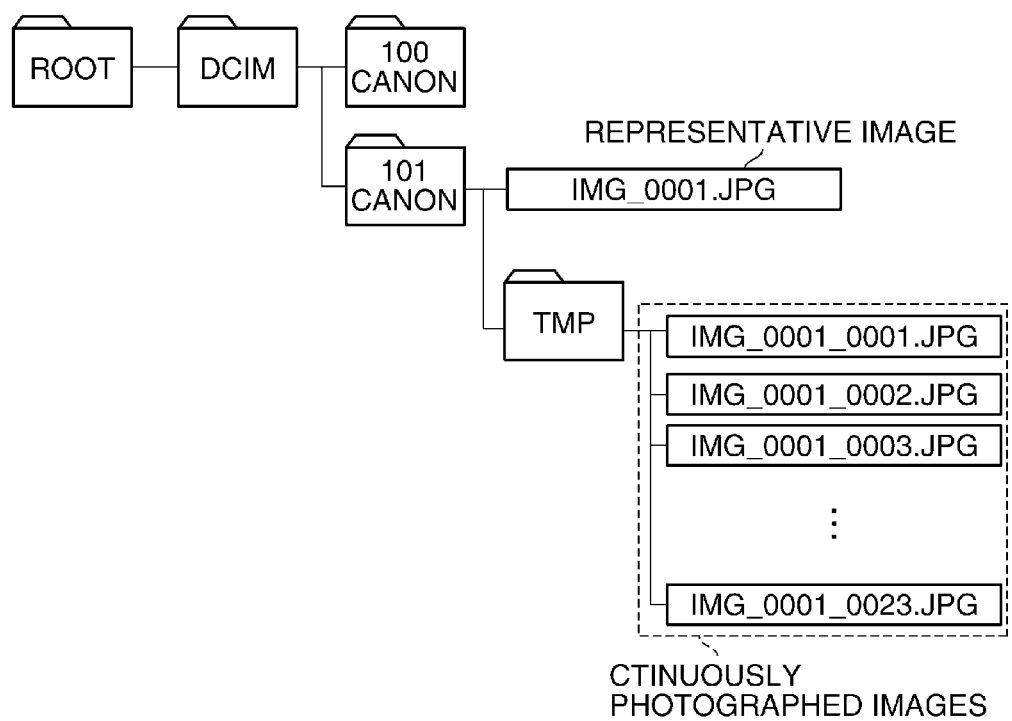
FIG. 7B is a view schematically showing still another example of the way in which file names not conforming to the DCF standard are added to plural files in the plural-file storage process shown in FIG. 5.

In the example shown in FIG. 7A, the representative image and the continuously photographed images are stored into the same folder (i.e., the 101CANON folder). Alternatively, as shown in FIG. 7B, it is possible to collectively store the continuously photographed images into a "TMP folder" provided in the 101CANON folder for exclusive use for the continuously photographed images. It is also possible to provide a folder for the continuously photographed images in a directory other than a DCIM directory or other than a root directory.

By performing the above-described image file management in the digital camera 100, it becomes possible to photograph many number of images that can be stored by use of file names conforming to the DCF standard, even if there are a vast number of continuously photographed images. By configuring the digital camera 100 such that only one or more representative images each added with a file name conforming to the DCF standard are displayed at the image preview, it becomes easy for the user to find the desired image file, without the need of feeding one by one a vast number of similar images.

The present invention is not limited to the above-described embodiment, and can be modified and changed in various manners.

For example, in the above-described embodiment, the representative image selection process and the plural-file storage process are always performed in the continuous photographing g mode, but this is not limitative. It is possible to perform these processes according to a result of a determination to determine based on the number of continuously photographed images, continuous photographing interval, or the like whether the representative image selection process and/or the plural-file storage process should be made. If it is determined that it is not necessary to perform the representative image selection process and the plural-file storage process, all the continuous photographed images added with file names conforming to the DCF standard can be stored into the memory card 200 as in a conventional manner.

In the above-described embodiment, the representative image selection process is performed by the user. Alternatively, one or more representative images can be automatically selected and decided by the control unit 101 of the digital camera 100 according to a predetermined judgment criterion. The automatic representative image selection can be realized by a known method such as a method in which evaluation values for respective images are calculated based on photographing conditions (focus, exposure, etc.) and an image having the highest evaluation value is automatically selected as a representative image or a method in which an image with the minimum number of blocked-up pixels or blown out pixels is recorded as a representative image.

In the above-described embodiment, a case has been described where this invention is applied to a digital camera, but this is not limitative. This invention is also applicable to any apparatus having an image pickup unit and a storage unit for photographed images, such as a cellular phone with camera, a portable game machine with camera, and a video camera. In the above-described embodiment, the memory card 200 detachably mounted to the digital camera 100 is used as a storage medium for storing representative images and continuously photographed images. However, the storage medium can be incorporated in or fixedly mounted to the digital camera 100, and is not limited to the memory card.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-152850, filed Jul. 5, 2010, which is hereby incorporated by reference herein in its entirety.

What is claimed is:

1. An image processing apparatus comprising: an image pickup unit configured to pickup an image;
   a storage unit configured to store, as a file, the image obtained by said image pickup unit;
   a representative image selection unit configured to select at least one representative image from among images photographed by continuous photographing in a case where the continuous photographing is performed by said image pickup unit; and
   a control unit configured to store into said storage unit the representative image selected by said representative image selection unit and added with a file name conforming to a DCF (Design Rule for Camera File System) standard and to store, into said storage unit, images other than the representative image while adding file names each not conforming to the DCF standard,
   wherein each of the file names not conforming to the DCF standard includes part of the file name of the representative image and information that identifies a photographing order following the part of the file name of the representative image.

2. The image processing apparatus according to claim 1, wherein the representative image is stored into a directory conforming to the DCF standard, and the images other than the representative image are stored into a directory not conforming to the DCF standard.

3. The image processing apparatus according to claim 1, wherein said representative image selection unit includes an operation unit by which the at least one representative image is selectable according to a users operation.

4. The image processing apparatus according to claim 1, wherein said representative image selection unit includes an automatic selection unit for automatically selecting the at least one representative image according to a predetermined criterion of judgment.

5. An image file management method for an image processing apparatus having an image pickup unit and a storage unit for storing an image photographed by the image pickup unit, the method comprising:

a representative image selection step of selecting at least one representative image from among images photographed by continuous photographing in a case where the continuous photographing is performed by the image pickup unit; and a storage step of storing into the storage unit the representative image selected in said representative image selection step and added with a file name conforming to a DCF (Design Rule for Camera File System) standard; and storing, into the storage unit, images other than the representative image while adding file names each not conforming to the DCF standard, wherein each of the file names not conforming to the DCF standard includes part of the file name of the representative image and information that identifies a photographing order following the part of the file name of the representative image.

\* \* \* \* \*